(12) United States Patent
Sundin

(10) Patent No.: US 7,404,294 B2
(45) Date of Patent: Jul. 29, 2008

(54) GAS TURBINE AND A METHOD FOR CONTROLLING A GAS TURBINE

(75) Inventor: Lars Sundin, Malmö (SE)

(73) Assignee: Volvo Aero Corporation, Trollhattan (SE)

( * ) Notice: Subject to any disclaimer, the term of this patent is extended or adjusted under 35 U.S.C. 154(b) by 78 days.

(21) Appl. No.: 11/164,752

(22) Filed: Dec. 5, 2005

(65) Prior Publication Data

US 2006/0272333 A1 Dec. 7, 2006

Related U.S. Application Data

(63) Continuation of application No. PCT/SE04/00856, filed on Jun. 2, 2004, now abandoned.

(30) Foreign Application Priority Data

Jun. 5, 2003 (SE) ..................................... 0301645

(51) Int. Cl.
*F02C 7/00* (2006.01)
*F02C 7/10* (2006.01)
*F02C 9/28* (2006.01)

(52) U.S. Cl. ................... 60/773; 60/39.281; 60/39.511; 60/803

(58) Field of Classification Search ................ 60/39.27, 60/39.281, 773, 803, 39.511
See application file for complete search history.

(56) References Cited

U.S. PATENT DOCUMENTS

| 2,631,677 | A | * | 3/1953 | Kochenburger et al. | .. 60/39.281 |
| 5,129,222 | A | | 7/1992 | Lampe et al. | |
| 5,533,329 | A | * | 7/1996 | Ohyama et al. | ............... 60/773 |
| 6,095,793 | A | | 8/2000 | Greeb | |
| 6,405,521 | B1 | | 6/2002 | Ranasinghe et al. | |
| 6,945,030 | B2 | * | 9/2005 | Hirayama et al. | .......... 60/39.27 |

FOREIGN PATENT DOCUMENTS

| GB | 701503 | 12/1953 |
| GB | 806345 | 12/1958 |

OTHER PUBLICATIONS

International Search Report for International Patent Application PCT/SE2004/000856, dated Aug. 4, 2004.

* cited by examiner

*Primary Examiner*—L. J. Casaregola
(74) *Attorney, Agent, or Firm*—Novak Druce + Quigg, LLP

(57) ABSTRACT

Method and arrangement for providing and controlling a gas turbine (1) at least one turbine (11, 20, 20'), at least one compressor (2, 5) driven by the turbine and a combustion chamber (16) arranged between the compressor and the turbine in the airflow path. The gas turbine includes devices (8) for direct measurement of the air mass flow at a position upstream of the combustion chamber in the airflow path, with the aim of regulating the quantity of fuel that is delivered to the combustion chamber (16) on the basis of the measured air mass flow.

10 Claims, 2 Drawing Sheets

GAS TURBINE AND A METHOD FOR CONTROLLING A GAS TURBINE

CROSS-REFERENCE TO RELATED APPLICATIONS

The present application is a continuation patent application of International Application No. PCT/SE2004/000856 filed 2 Jun. 2004 which is published in English pursuant to Article 21(2) of the Patent Cooperation Treaty and which claims priority to Swedish Application No. 0301645-8 filed 5 Jun. 2003. Said applications are expressly incorporated herein by reference in their entireties.

BACKGROUND OF THE INVENTION

The present invention relates to a gas turbine. The invention further relates to a method for controlling a gas turbine. The gas turbine includes at least one turbine, at least one compressor driven by the turbine and a combustion chamber arranged between the compressor and the turbine in the airflow path. The gas turbine is designed for compressing the gas in the compressor, heating the compressed gas in the combustion chamber and expansion of the heated gas in the turbine.

Gas turbines are used, for example, as engines for vehicles and aircraft, as prime movers for ships and for generating electricity in power stations. The present invention is primarily directed towards applications in which transient processes occur; that is to say, for dynamic applications. In such transient processes the load of the gas turbine varies relatively rapidly. One example of an application in which such transient processes are frequently performed is where the gas turbine is used to propel a vehicle or a vessel. These applications require acceleration and retardation on the part of the gas turbine. Still further, more stringent requirements for the low output of exhaust gas emissions call for precise control of the fuel supply even during transients.

In stationary operation the fuel supply is typically controlled by a feedback regulator reacting to the speed, pressure or temperature of the gas turbine. These quantities, however, are not stable in the case of rapid transients.

Traditionally, an air mass flow is calculated on the basis of other measurable quantities, such as gas generator speed or compressor pressure and the quantity of fuel delivered to the combustion chamber during transients is metered on the basis of the calculated air mass flow.

In many applications, and especially in the case of transient processes, great accuracy and speed are required. Such transients are furthermore usually associated with peak emissions since known solutions do not provide sufficiently rapid feedback control. It would therefore be desirable to achieve reduced exhaust emissions in the case of transients.

SUMMARY OF THE INVENTION

A first object of the invention is to provide a gas turbine that creates the prerequisites for accurate metering of fuel to the combustion chamber, and especially during transient operation.

This object is achieved in that the gas turbine comprises means for direct measurement of the air mass flow at a position upstream of the combustion chamber in the airflow path, with the aim of regulating the quantity of fuel that is delivered to the combustion chamber on the basis of the measured air mass flow.

According to a preferred embodiment, the means for direct measurement of the air mass flow comprises hot-film or hot-wire for the measuring.

According to another preferred embodiment the gas turbine comprises two compressors with an intercooler arranged between them and the means for direct measurement of the air mass flow is arranged downstream of the intercooler and upstream of the second compressor in the airflow path. In this way the air mass flow is measured after cooling; that is to say, at a relatively low temperature.

A second object of the invention is to provide a method for controlling a gas turbine that gives an accurate metering of fuel to the combustion chamber, especially during transient operation.

This object is achieved in that the air mass flow is measured directly at a position upstream of the combustion chamber of the gas turbine in the airflow path, and in that the quantity of fuel that is delivered to the combustion chamber is regulated on the basis of the measured air mass flow. The air mass flow is therefore explicitly measured and the fuel is metered on the basis of the value (s) measured.

BRIEF DESCRIPTION OF THE DRAWINGS

The invention will be described in more detail below with reference to the embodiment shown in the accompanying drawings, and in which.

DETAILED DESCRIPTION

Figure 1:
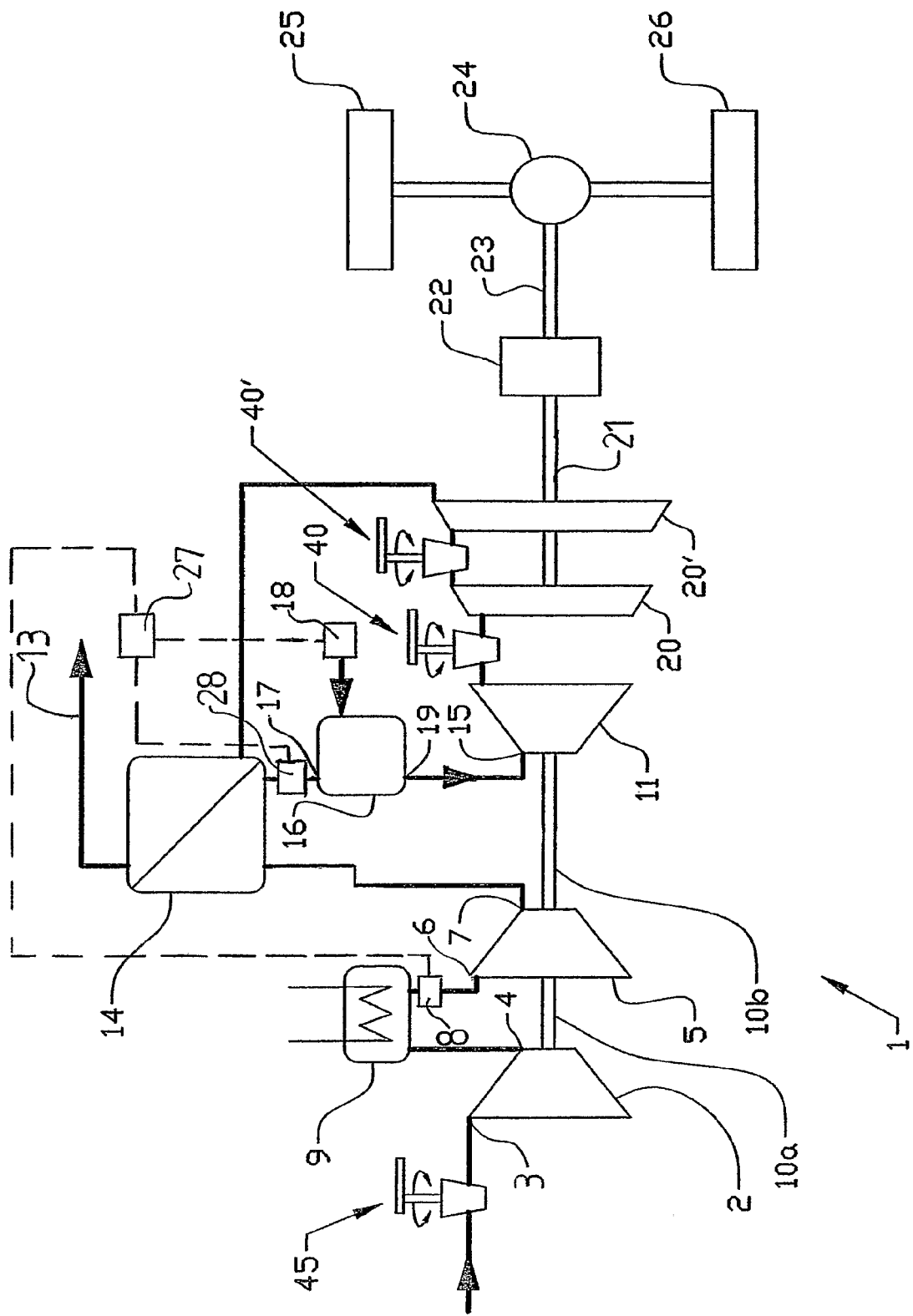
FIG. 1 shows a schematic diagram of a gas turbine.

FIG. 1 shows a schematic diagram of a twin-shaft gas turbine 1 configured according to a first embodiment of the invention. This is a suitable construction for a gas turbine with low-emission combustion chamber in an application in which transients occur. The gas turbine 1 comprises (includes, but is not necessarily limited to) a first compressor 2 having a first compressor inlet 3 and a first compressor outlet 4 together with a second compressor 5 having a second compressor inlet 6 and a second compressor outlet 7. The compressor inlet 3 of the first compressor 2 is open to the atmosphere via an air filter (not shown). An intercooler 9, the function of which is to cool the air compressed by the first compressor 2 before a further pressure increase occurs in the second compressor 5, is arranged between the compressor outlet 4 of the first compressor 2 and the compressor inlet 6 of the second compressor 5. The intercooler 9 is coupled to a separate cooling system (not shown).

Each compressor 2,5 further comprises a compressor wheel, said wheels having a rotationally fixed connection to one another via a shaft 10a, 10b, and to a turbine wheel arranged in a turbine 11.

A heat exchanger 14 for recovering exhaust gas heat in operation is arranged downstream of the compressor outlet 7 of the second compressor 5.

The compressed air is thereafter fed to a combustion chamber 16, via the gas inlet 17 thereof, to which fuel is delivered by means of a fuel system 18 and burned therein with the aid of the hot compressed air. The hot combustion gases are led via the gas outlet 19 of the combustion chamber 16 to said turbine 11, where a first limited expansion of the combustion gases occurs for driving said compressors 2,5. The final expansion, down to near atmospheric pressure, takes place in a power turbine 20 arranged downstream of said turbine 11. Energy can be recovered by finally leading the combustion gases from the power turbine 20 through said heat exchanger 14, before the gases are led to the exhaust gas outlet 13, which contributes to the increased overall efficiency of the gas turbine 1.

In the embodiment shown, two drive turbines 20, 20' are arranged on the drive shaft 23. Each of these turbines is equipped with means 40, 40' for variable adjustment of the flow to the power turbine 20, 20'. These adjustment means comprise a variable stator, or guide vanes. The guide vanes are designed to regulate the quantity of gas to the power turbine, thereby making it possible to control the inlet temperature to the turbine.

The gas turbine also comprises means 45 for variable adjustment of the flow to the first compressor 2. This adjustment means 45 comprises a variable stator, or guide vanes. The guide vanes are designed to regulate the angle of incidence of the flow to the compressor, thereby making it possible to control the compressor pressure increase.

An output shaft 21 from the power turbine 20 is connected by way of a transmission 22 to a drive shaft 23 of the vehicle that the gas turbine 1 is designed to drive. The drive shaft 23 is in turn coupled to a differential 24, which distributes the drive torque to the drive wheels 25,26 of the vehicle.

The gas turbine 1 comprises means 8 for direct measurement of the air mass flow at a position downstream of the intercooler 9 in the airflow path. The means 8 for direct measurement of the air mass flow is more specifically arranged upstream of the second compressor 5 in the airflow path. The gas turbine 1 further comprises a control unit 27 connected to the means 8 for direct measurement of the air mass flow (see dashed lines in FIG. 1). The control unit 27 is also connected to the fuel system 18 for regulating the quantity of fuel delivered on the basis of the measured air mass flow. This makes it possible to control the air-fuel mixture accurately so as to obtain optimum combustion from the point of view of emissions. The control unit 27 consists of a computer and contains software for processing input data from the means 8 for direct measurement of the air mass flow and controlling the quantity of fuel. The steps performed by the control unit 27 using a control law are described below in the form of a flow chart, (see FIG. 2).

The means 8 for direct measurement of the air mass flow preferably comprises hot-film or hot-wire for the measuring. Hot-film or hot-wire systems are conventional measuring methods which are not therefore described here in greater detail.

The gas turbine 1 further comprises means 28 for measuring the temperature of the air in the fuel chamber inlet with the aim of regulating the quantity of fuel that is delivered to the combustion chamber, also on the basis of the measured temperature. The temperature-measuring device 28 is therefore also connected to the control unit 27. This is particularly preferred in the case of recuperative gas turbines.

Figure 2:
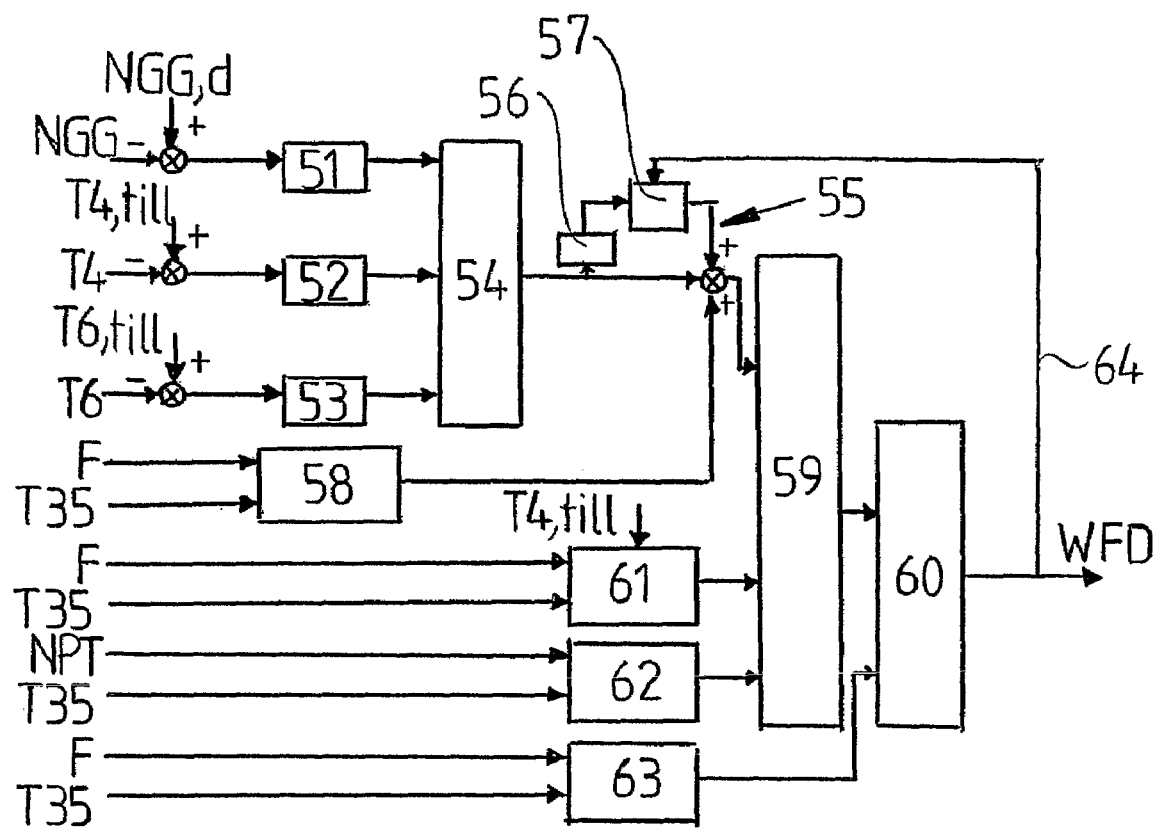
FIG. 2 shows a control scheme for regulating the gas turbine.

FIG. 2 shows the control law for determining the quantity of fuel that must be delivered to the combustion chamber 16, according to a preferred embodiment. The control system has feedback control of the required speed of the so-called gas generator (GG). The speed is termed NGG and there is also a feedback limiting of the temperature at two points downstream of the combustion chamber 16, referred to as T4 and T6.

The control system comprises three feedback regulators (PD) 51,52,53 in the form of so-called proportional, derivative regulators, which calculate a desired increase or reduction of the fuel quantity. This means that the signal is proportional to the error and the variation in the error over time. The minimum signal is selected in a min select 54. After the min select an integrated signal is added in an integrator 55. On the input to the integrator 55 there is a limit function 56, and a function (1/s) 57 that interrupts the integration if the feedback regulator is not selected in the following select block (min select or max select) 59,60. A feedback 64 (anti windup) is provided for this.

From the measured mass flow, F (FLOW) via the means 8 for air mass flow measurement and the measured temperature upstream of the combustion chamber (T35) via the temperature measuring device 28, the stationary fuel flow normally required by the engine at a given flow and temperature is calculated from a table function (steady state fuel schedule) 58. This fuel flow is added to the signal from the feedback regulator and the integrator 55. In this way the feedback regulator primarily achieves a corrective effect on the fuel flow. A disturbance of the mass flow produces a correction of the fuel quantity with direct effect.

In the min select 59, the fuel quantity is compared with a table function (acc limiting) 61, which gives the maximum fuel quantity as a function of FLOW and T35 together with the admissible temperature (T4, lim) T4, till. This function is selected primarily during accelerations and prevents rapid temperature rises that would otherwise produce increased emissions of nitrogen oxides. The limit function (NPT limiting) 62 for the speed (N) of the free power turbine (PT) is a safety function designed to prevent overheating. Finally a max select 60 is provided in which the calculated fuel flow is compared with a minimum flow from a function (Dec. schedule) 63. This function prevents poor combustion and hence emissions of unburned hydrocarbons and carbon monoxide, in the event of a fuel reduction, as well as possible extinguishing of the combustion chamber. The output signal from the diagram (WFD) represents a fuel signal.

The gas turbine as has been described above comprises a free power turbine. This is a preferred but in no way limiting application of the invention. The arrangement of the compressor, the turbine for driving the compressor via the first shaft, and the combustion chamber is usually referred to as a gas generator. The power turbine connected to a drive shaft is arranged downstream of the first turbine and is designed to be driven by the gas from the first turbine. In other words, the only thing connecting the gas generator and the power turbine are the expanded hot gases.

The gas turbine described is furthermore of the recuperative or regenerative type; that is to say, comprising a heat exchanger 14 that is designed to recover energy from the hot gases.

Figure 3:
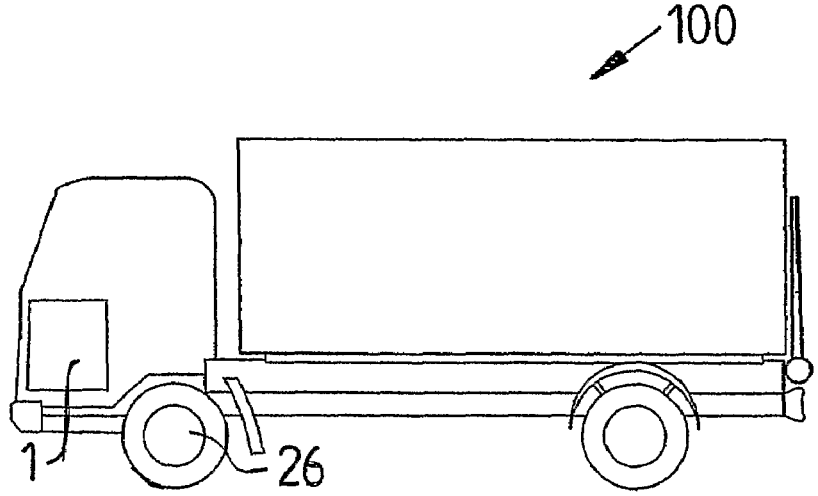
FIG. 3 shows a side view of a vehicle, in the form of a truck, which is driven by the gas turbine.

FIG. 3 shows a truck 100, which is driven by the gas turbine 1 (shown only schematically) according to FIG. 1. This must be regarded solely as one possible application of the invention and the invention must not be seen as being limited to this application.

The invention must not be seen as being limited to the embodiment described above, a number of modifications of this being feasible without departing from the scope of the patent. For example, both the number of compressor stages and the number of turbine stages can be varied in either direction.

The scope of the patent encompasses, for example, a gas turbine of single-shaft type; that is to say, the turbine connected to the compressor is also designed to form the drive turbine for propelling a vehicle.

As an alternative to the means 8 for measurement of the air mass flow being located downstream of the intercooler 9 and upstream of the second compressor 5, said means may be arranged downstream of the second compressor and upstream of the combustion chamber.

As an alternative to, or variation of the gas turbine described above, a by-pass valve may be arranged directly on the output side of the first compressor 2 in order to avoid pumping in the first compressor. The air that is by passed is then led out in the exhaust pipe 13.

It is furthermore feasible to use some technology other than hot-film or hot-wire technology for measuring the air mass flow.

What is claimed is:

1. A gas turbine (1), comprising:
    at least one turbine (11,20, 20'), at least one compressor (2,5) driven by the turbine and a combustion chamber (16) arranged between the compressor and the turbine in an airflow path of the gas turbine (1); and
    said gas turbine further comprising measurement means (8) for directly measuring the air mass flow at a position upstream of the combustion chamber (16) in the airflow path and a regulating means that regulates the quantity of fuel delivered to the combustion chamber in dependence on the measured air mass flow;
    wherein the measurement means (8) further comprises one of (1) hot-film and (2) hot-wire for measurement taking.

2. The gas turbine as recited in claim 1, wherein the gas turbine (1) further comprises adjustment means (40, 40', 45) for variably adjusting geometry of at least one of the turbine (11,20, 20') and the compressor (2,5).

3. A gas turbine (1), comprising: at least one turbine (11,20, 20'), at least one compressor (2,5) driven by the turbine and a combustion chamber (16) arranged between the compressor and the turbine in an airflow path of the gas turbine (1); and
    said gas turbine further comprising measurement means (8) for directly measuring the air mass flow at a position upstream of the combustion chamber (16) in the airflow path and a regulating means that regulates the quantity of fuel delivered to the combustion chamber in dependence on the measured air mass flow;
    wherein the gas turbine (1) further comprises a heat exchanger (14) arranged between the compressor (2,5) and the combustion chamber (16) for recovering exhaust gas heat.

4. The gas turbine as recited in claim 1, wherein the measurement means (8) is arranged in the inlet to the compressor.

5. The gas turbine as recited in claim 1, wherein the gas turbine further comprises two compressors (2,5) with an intercooler (9) arranged therebetween.

6. The gas turbine as recited in claim 5, wherein the measurement means (8) is located downstream of the intercooler (9) and upstream of the second compressor (5) in the airflow path.

7. A gas turbine (1), comprising: at least one turbine (11,20, 20'), at least one compressor (2,5) driven by the turbine and a combustion chamber (16) arranged between the compressor and the turbine in an airflow path of the gas turbine (1); and
    said gas turbine further comprising measurement means (8) for directly measuring the air mass flow at a position upstream of the combustion chamber (16) in the airflow path and a regulating means that regulates the quantity of fuel delivered to the combustion chamber in dependence on the measured air mass flow;
    wherein the gas turbine (1) further comprises temperature measuring means (28) for measuring the temperature of the air at a position upstream of the combustion chamber (16) in the airflow path and a fuel regulating means for regulating the quantity of fuel that is delivered to the combustion chamber in dependence on the measured temperature.

8. The gas turbine as recited in claim 1, wherein the gas turbine (1) is incorporated into a vehicle (100) that is thereby propelled.

9. A method for controlling a gas turbine, comprising: directly measuring an air mass flow in the airflow path of the gas turbine at a position upstream of a combustion chamber (16) thererof, and
    regulating the quantity of fuel that is delivered to the combustion chamber based on the measured air mass flow;
    wherein the airflow is measured using one of (1) a hot-film and (2) hot-wire technology.

10. A method for controlling a gas turbine, comprising: directly measuring an air mass flow in the airflow path of the gas turbine at a position upstream of a combustion chamber (16) thererof, and
    regulating the quantity of fuel that is delivered to the combustion chamber based on the measured air mass flow;
    wherein the temperature of the air is measured at a position upstream of the combustion chamber (16) of the gas turbine in the airflow path and the quantity of fuel that is delivered to the combustion chamber is regulated on the basis of the measured air temperature.

* * * * *